(12) United States Patent
Asano et al.

(10) Patent No.: US 7,236,348 B2
(45) Date of Patent: Jun. 26, 2007

(54) FUNCTIONAL SHEET HAVING REINFORCING MATERIAL

(75) Inventors: Yoshitaka Asano, Gojo (JP); Toru Sugitani, Gojo (JP); Michinao Hayashi, Tokyo (JP); Daijirou Akiyama, Tokyo (JP)

(73) Assignee: Nippon Valqua Industries, Ltd., Tokyo (JP)

( * ) Notice: Subject to any disclaimer, the term of this patent is extended or adjusted under 35 U.S.C. 154(b) by 0 days.

(21) Appl. No.: 10/525,319

(22) PCT Filed: Aug. 19, 2003

(86) PCT No.: PCT/JP03/10448

§ 371 (c)(1), (2), (4) Date: Feb. 23, 2005

(87) PCT Pub. No.: WO2004/018200

PCT Pub. Date: Mar. 4, 2004

(65) Prior Publication Data

US 2006/0039100 A1    Feb. 23, 2006

(30) Foreign Application Priority Data

Aug. 23, 2002   (JP) .............................. 2002-244261

(51) Int. Cl.
*H01G 9/00*   (2006.01)

(52) U.S. Cl. ...................... 361/502; 361/503; 361/504; 361/508; 361/512

(58) Field of Classification Search ........ 361/502–512, 361/523–529
See application file for complete search history.

(56) References Cited

U.S. PATENT DOCUMENTS

| 4,488,203 | A | * | 12/1984 | Muranaka et al. | .......... 361/502 |
| 4,725,927 | A | * | 2/1988 | Morimoto et al. | .......... 361/502 |
| 4,737,889 | A | * | 4/1988 | Nishino et al. | ............. 361/502 |
| 4,862,328 | A | * | 8/1989 | Morimoto et al. | .......... 361/502 |
| 4,891,264 | A |   | 1/1990 | Daimon et al. | |

FOREIGN PATENT DOCUMENTS

| DE | 3888665 C | 4/1994 |
| JP | 1-80332 U | 5/1989 |

(Continued)

*Primary Examiner*—Nguyen T. Ha
(74) *Attorney, Agent, or Firm*—The Webb Law Firm

(57) ABSTRACT

A reinforcing material-having functional sheet of a sheet-like functional material including a functional powder and a binder resin and, laminated thereon, a reinforcing sheet comprising a woven fabric or a non-woven fabric, which are bonded, wherein the basis weight of the reinforcing sheet, the fiber diameter of the fiber constituting the reinforcing sheet and the functional sheet thickness are in specific ranges. A sheet-like electrode for electric double layer capacitors, which electrode comprises a sheet-like electrode of carbon fine powder and a fluorine-containing polymer resin and, laminated thereon, the reinforcing sheet, and an electric double layer capacitor having this electrode. The functional sheet has strength and no elimination of the functional material powder, and also efficiently exhibits high functional properties. The sheet electrode can efficiently prepare electric double layer capacitors having strength, remarkably low internal resistance, slight lowering of charging and discharging capabilities, excellent durability and long lifetime.

18 Claims, 3 Drawing Sheets

FOREIGN PATENT DOCUMENTS

| JP | 2-172734 A | 7/1990 |
| JP | 9-309957 A | 12/1997 |
| JP | 2000-150321 A | 5/2000 |
| JP | 2000-182902 A | 6/2000 |
| JP | 2000-208373 A | 7/2000 |
| JP | 3171454 B | 5/2001 |

* cited by examiner (A)

(B)

FUNCTIONAL SHEET HAVING REINFORCING MATERIAL

FIELD OF THE INVENTION

The present invention relates to functional sheets having a reinforcing material, more particularly relates to thin functional sheets having a reinforcing material capable of sufficiently exhibiting effects of the functional material and having sufficient strength in handling.

Furthermore, the present invention relates to sheet-like electrodes, which are one kind of the functional sheets having a reinforcing material as described above and are used as an electrode for electric double layer capacitors, more particularly relates to reinforcing material having sheet-like electrodes for electric double layer condensers having so excellent mass production properties and handling properties that the electrodes can prepare electric double layer capacitors having a low internal resistance, low deterioration of charging and discharging capabilities, excellent durability and long lifetime, and further which electrodes have sufficient strength, can be molded continuously and can be molded into a long length form.

DESCRIPTION OF THE RELATED ART

Conventionally, sheet-like products obtainable by using materials having various kinds of functions such as catalyst functions, electric double layer capacitors and the like, for example, sheet-like products having catalyst functions are generally prepared by kneading a resin having a binder effect and a material having various kinds of functions such as catalyst functions or the like and rolling out the resulting mixture into a sheet.

However, in the case that a catalyst material having a fine particle diameter is molded into a sheet by using a binder resin, the resulting sheet itself does not have strength and has a problem such that a function material is separated and eliminated.

Further, when the binder amount is increased in order to keep strength in a certain extent, a problem such that various functions of the functional material powder are hindered is caused.

Furthermore, JP-B-3171454 discloses a sheet-like adsorption filter formed from a polytetrafluoroethylene resin molded article containing 25 to 90% by weight of a porous adsorbent powder having a particle diameter of not more than 0.5 mm. It also discloses the sheet is laminated and bonded on a cloth and can be handled as a cloth-like product. However, the cloth-like product has a problem such that the cloth easily comes away from the polytetrafluoroethylene resin molded article.

Therefore, the advent of a reinforcing material having functional sheet having strength even if being thin, free from separation of a functional material, capable of molding a sheet continuously and also having excellent mass production properties has been desired.

In particular, the above electric double-layer capacitor has the following problems.

The electric double layer capacitor (electric double layer condenser) is a condenser capable of storing electricity utilizing "electric double layer" formed by a polarizing electrode and an electrolytic interface. As compared with secondary batteries utilizing chemical reaction, the electric double layer capacitor can charge and discharge rapidly, has non-polluting because of containing no heavy metals and many other advantages. Accordingly, it is desired that the electric double layer capacitor be used to various kinds of applications including from small-sized capacitors for electronic devices to large-sized capacitors for cars.

The electric double layer means an interface phenomenon such that in the interface where two different layers such as a solid electrode and an electrolyte solution are contacted, positive and negative electric charges are arranged facing each other with a very short distance. In the charged state of a capacitor, plus ions and negative ions present in the electrolyte solution are respectively arranged facing with the positions of the electrodes and thereby negative charges are stored in the plus ion side and positive charges are stored in the minus ion side by the phenomenon of the electric double layer.

As the electrodes of the electric double-layer capacitor, an electrode essentially composed of carbon materials such as active carbon and the like is generally used and a sheet-like electrode essentially containing carbon and a fluorine-containing resin is mainly used.

As a process for preparing the electrodes, there are a rolling method and a doctor blade method. The methods are variously improved for the sake of making a high capacity and prolonging the lifetime.

The electric double-layer capacitor is a condenser capable of repeatedly carrying out charging and discharging but has a problem such that when it is used for a long period of time, the charging and discharging capabilities of the condenser are lowered gradually.

Therefore, the development of electric double-layer capacitors having more excellent durability, a lower internal resistance, a higher capacity and better handling properties, as compared with conventional capacitors, has been desired conventionally.

In order to lower the internal resistance, it is effective to lower the binder amount to the utmost. Now, PTFE is used as a binder in a very small amount in order to secure the conductivity and impregnating properties of the electrolyte solution, and the amount thereof is usually about from 5 to 20% by weight.

The PTFE particles are fiberized by application of a shear force in the kneading and rolling steps. The finely fiberized PTFE binds mutual active carbon particles or mutual conductive carbon articles. Therefore, as a method of enhancing the sheet strength without increasing the binder amount, it is considered that the fiberization of PTFE is enhanced with kneading or the like.

Adding the fiberization step (namely, enhancing the fiberization), the binder force of PTFE as a binder is increased, but the formed sheet-like electrodes lack in mass production and have inferior handling properties in use thereof because the sheet-like electrodes have strength capable of just holding themselves and the strength of the sheet-like electrodes themselves is low.

Furthermore, when the fiberization is accelerated, the electrode density is too high, and then the impregnating properties of the electrolyte solution are decreased and moreover, the number of the procedures in the kneading step and rolling step is increased and thereby the mass production properties are decreased. Additionally, it is necessary to conduct heat treatment at a higher temperature because the moisture contained in the active carbon electrodes is removed in order to prepare capacitors having low deterioration in capacity and long lifetime. (When an organic electrolyte solution is used, electrolysis is accelerated even if a small amount of moisture is present and thereby capacity deterioration is markedly caused).

JP-A-2000-208373 discloses a process for preparing polar electrodes for collecting electrode-having electric double-layer capacitors, which process comprises laminating a sheet-like molded article comprised of a carbon fine powder essentially containing a carbon material capable of contributing to electrostatic capacity development and a fluorine resin as a binder, a sheet-like molded article comprised of a carbon fine powder essentially containing a carbon material having electrical conductivity imparting function and a binder, and a conductive metal foil and uniting the resulting laminate by roll pressing.

In the process disclosed in this publication, the polarizable electrode and the collecting electrode are united by roll pressing through the sheet-like molded article having excellent conductivity and thereby the contact resistance is decreased.

Further, JP-A-2000-150321 and JP-A-2000-182902 disclose a process for preparing a polarizable electrode for electric double-layer capacitors having sufficient strength even if having a decreased thickness, which process comprises molding a mixed product of a carbon fine powder and a fluorine-containing resin into a sheet.

The process does not prepare reinforcing material-having functional sheets having capability of preparing a sheet-like electrode having a smaller internal resistance and excellent durability, sufficient strength, good mass production properties and high capacity with low cost, such as electrode sheets and the like.

OBJECT OF THE INVENTION

The present invention is intended to solve the problems associated with the above prior art and it is an object of the invention to provide a reinforcing material-having thin functional sheet having sufficient strength and capable of exhibiting high functional properties.

It is another object of the invention to provide an electrode for electric double-layer capacitors which electrode can prepare an electric double-layer capacitor, which is one kind of the above described reinforcing-having functional sheet, having high electrode strength, very low internal resistance, low lowering in charging and discharging capabilities, excellent durability and long lifetime with good efficiency for a short time.

It is a further object of the invention to provide an electric double-layer capacitor having the above electrodes for electric double-layer capacitors.

SUMMARY OF THE INVENTION

The reinforcing material-having functional sheet according to the present invention comprises a sheet-like functional material comprising a functional material powder and a binder resin, and, laminated thereon, a reinforcing sheet, which are bonded, wherein the reinforcing sheet comprises a woven or non-woven fabric cloth and has a basis weight of from 10 to 400 g/cm² and the diameter of a fiber constituting the reinforcing sheet is from 10 to 150 μm.

In the present invention, the binder resin is an un-sintered polytetrafluoroethylene resin and is preferably contained in an amount of from 50 to 1% by weight based on the total amount of the sheet-like functional material.

The functional material powder preferably comprises one kind or two or more kinds selected from active carbon, graphite, carbon black, bamboo charcoal, charcoal, titanium oxide, zinc oxide, lead oxide, silica, clay, metal powder, expanded graphite, water-absorbent polymer, silica gel, mildew proofing agent and antibacterial agent.

The reinforcing material-having functional sheet of the present invention may be subjected to embossing processing.

The electrode for electric double-layer capacitors according to the present invention comprises a sheet-like electrode material comprising a carbon fine powder and a fluorine-containing polymer resin and, laminated thereon, a reinforcing sheet, which are bonded.

In the present invention, the reinforcing sheet comprises any one of a cloth, a mesh, a non-woven fabric cloth and an expanded sheet, and has a thickness of from 0.01 to 1.0 mm.

In the sheet-like electrode material, it is preferred that the carbon fine powder comprises active carbon and/or conductive carbon, and the fluorine polymer resin be polytetrafluoroethylene.

The fluorine resin is contained in an amount of preferably not more than 15% by weight in the electrode material.

The electric double-layer capacitor of the present invention has the above electrode for electric double-layer capacitors.

The present invention can provide a reinforcing material-having thin functional sheet having sufficient strength, free from elimination of the functional material powder and capable of effectively exhibiting high functional properties with good mass production properties at low cost.

The present invention further provides an electrode for electric double-layer capacitors, which electrode is one kind of reinforcing material-having functional sheets, having markedly low internal resistance, strength, free from elimination of the functional material powder such as a catalyst and the like, capable of being molded continuously, capable of molding into a long size and excellent mass production properties and also provides an electric double-layer capacitor at low cost.

BRIEF DESCRIPTION OF THE DRAWINGS

FIG. 1(A) is an illustrative diagram showing peeling of a functional sheet prepared in Comparative Example A1, and FIG. 1(B) is an illustrative diagram showing peeling of a functional sheet prepared in Example A1.

DETAILED DESCRIPTION OF THE INVENTION

Figure 1:
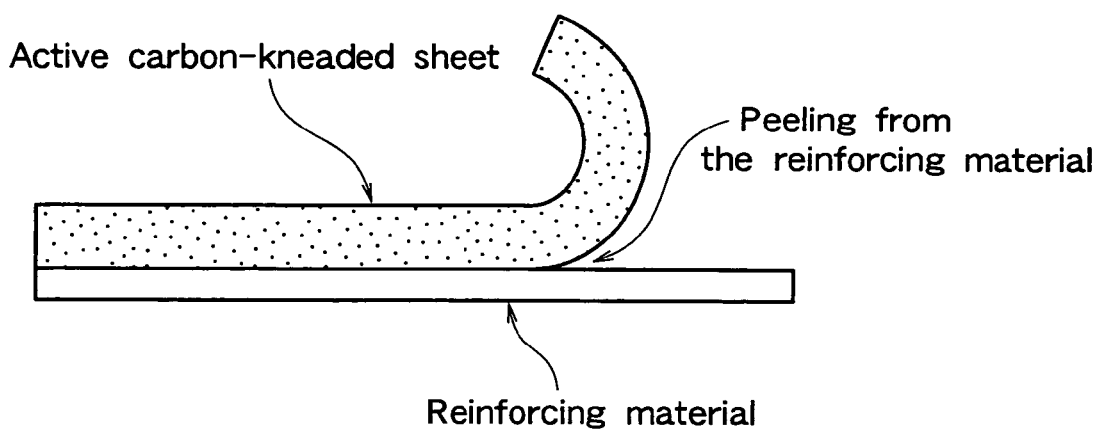
FIG. 1 is an illustrative diagram showing a peel test for a functional sheet.
Figure 1:
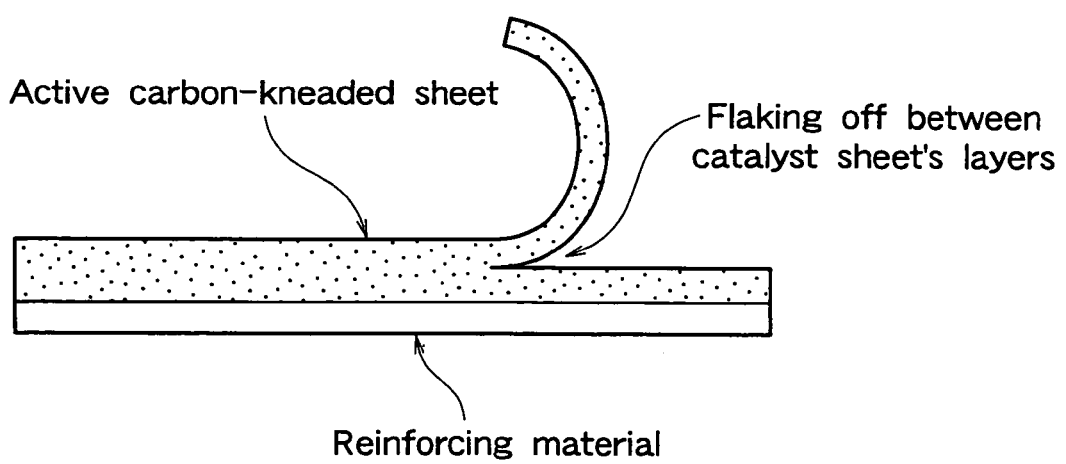

Hereinafter, the reinforcing material-having functional sheet (functional sheet), the electrode for electric double-layer capacitors which electrode is one of reinforcing material-having functional sheets and the electric double-layer capacitor according to the present invention will be described in detail.

Reinforcing Material-Having Functional Sheet

The reinforcing material-having functional sheet according to the present invention comprises a sheet-like functional material comprised of a functional material powder and a binder resin and, laminated thereon, a reinforcing sheet, which are bonded.

In the functional sheet, the sheet-like functional material layer may be formed on only one side of the reinforcing sheet or the sheet-like functional material layer may be formed on the front side and backside (both sides) of the reinforcing sheet.

The dimension of the reinforcing material-having functional sheet is not particularly limited and can be appropriately changed in accordance with the use, the scale of equipment and other requirements. The reinforcing material-having functional sheet is desirably thin in order to have a contact size and the thickness thereof is preferably not more than 0.8 mm.

The thickness of the sheet-like functional layer in the functional sheet is usually from 0.1 to 0.8 mm.

Functional Powder (Functional Material Powder)

The kind of the functional material powder can be appropriately changed in accordance with the use thereof.

Examples of the functional material powder may include:

carbonaceous materials such as active carbon, graphite, carbon black, bamboo charcoal, charcoal and the like;

metal oxides such as titanium oxide, zinc oxide, lead oxide, silica and the like; and powders such as clay (aluminum silicate), metal powder, expanded graphite, water-absorbent polymer, silica gel, mildew proofing agent, antibacterial agent and the like.

These functional material powders may be used singly or in combination with two or more.

When the functional material powder is at least one carbonaceous material selected from active carbon, bamboo charcoal, charcoal, graphite and carbon black, the reinforcing material-having functional sheet is preferably used to deodorization, improvement of the water quality, solvent adsorption and other applications. When the functional material powder is titanium oxide, the reinforcing material-having functional sheet is preferably used to a photocatalyst. Therefore, the reinforcing material-having functional sheet can have various functions in accordance with the functional material powders used.

Binder Resin

As the binder resin, conventionally known binders, which are resins capable of binding and bonding the functional powders and the like to each other, can be widely used and further any one of natural resin type binders and synthetic resin type binders may be used. Examples of the binders used herein may include fluororesins such as PTFE and the like; and olefin resins such as polyethylene, polypropylene and the like. Of these binders, the fluororesin is preferably used for molding a powdery solid into a sheet because the fluororesin is fibrillated by application with a shear force, and in the fibrillation, the resulting fibril has a fiber diameter of about from 0.01 to 0.05 μm so that it can unite and fix bindingly the functional powder having a particle diameter of not more than 800 μm mutually. In particular, unsintered polytetrafluoroethylene (PTFE) resin is preferred because of having excellent weathering resistance, heat resistance and acid resistance.

Examples of the un-sintered PTFE resin may include a molding powder prepared by suspension polymerization and a fine powder prepared by emulsion polymerization. Any of the above powders may be used, and further it is preferred to use a dispersion state thereof. The dispersion state PTFE resin has good dispersibility for catalyst in kneading with the functional powder and has good moldability because the functional powder is sufficiently supported on the PTFE fibril.

The binder represented by the un-sintered PTFE resin is contained in an amount of preferably from 50 to 1% by weight, more preferably 30 to 5% by weight in the sheet-like functional material. When the amount of the binder is less than 1% by weight, it is difficult to sufficiently support the functional material powder and thereby sheet molding is hardly performed. When the amount is over 50% by weight, the content of the functional material powder is low in the sheet-like functional material so that the resulting functional sheet cannot have high functional properties.

Reinforcing Sheet (Reinforcing Layer)

The reinforcing sheet needs to have void spaces to a certain extent because the kneadate or the sheet-like functional material in a softened state, each of which contains the functional material powder and the binder resin and is to be united by the method such as pressure bonding or the like, enters into the fibers of the reinforcing sheet and then is bonded with the reinforcing material utilizing the anchor effect.

Accordingly, the reinforcing sheet is preferably a woven fabric or non-woven fabric each having a basis weight, which is the weight of a fabric per unit area, of from 10 to 400 $g/m^2$, preferably 50 to 200 $g/m^2$ and the fibers, which constitute the reinforcing sheet, have a fibrous diameter of from 10 to 150 μm, prefer-ably 20 to 100 μm.

The reinforcing sheet has many void spaces and thereby the functional capability of the sheet-like functional material can be enhanced because the reinforcing sheet can have many exposed surfaces of the sheet-like functional material and also a large amount of the functional material on the reinforcing sheet surface.

When the fiber diameter in the reinforcing sheet is smaller than the above range, the sufficient anchor effect of the kneadate or the sheet-like catalyst in a soften state to the reinforcing sheet cannot obtained and thereby the reinforcing sheet easily peels away from the sheet-like functional material. On the other hand, when the fiber diameter is larger than the above range, the connection of the reinforcing material fiber becomes weak and thereby the reinforcing material cannot have sufficient strength.

Examples of the reinforcing material (reinforcing sheet) forming the reinforcing layer may include net-like fabrics or woven fabrics (cloth) in which fibers are connected at right angles, and cloth-like non-woven fabrics in which fibers are connected randomly, and the fabrics are formed from polymer materials, for example, synthetic resins such as polypropylene (PP), polyethylene (PE) and the like, natural fibers such as cellulose and the like, glass fiber and carbonaceous fibers including carbon fiber.

Preparation of Reinforcing Material-Having Functional Sheet

For preparing the sheet-like functional material, the functional powder and the binder resin are mixed to prepare the kneadate. In this mixing, additives such as water or alcohol may be added in order to improve the proccessability. The kneading procedure is generally performed by conventionally known kneading machines such as kneader, Banbury mixer and the like. However, the kneading machines are not limited to the above-mentioned machines, and it is possible to use machines capable of effectively giving kneading function such as shearing or compression to the materials. In the next step, the kneadate is optionally pre-molded and then subjected to compression molding with a press or the like, rolling molding with a roll and the like, or compression and rolling molding to prepare the sheet-like functional material.

Thereafter, the sheet can be efficiently prepared by a method such that the resulting sheet-like functional material and the reinforcing sheet are simultaneously passed through a rolling machine, or a method such that the reinforcing sheet and the sheet-like functional material are set in a laminated state to a compressor and pressure bonded. Further, it is also possible to employ a method such that the kneadate is spread on the reinforcing sheet and pressurized by a pressing machine.

Embossing Processing

For example, in the case of using the functional powder having the catalyst effect, the functional powder present on the surface exhibits the catalyst function and this effect is effective on only the surface so that it is necessary to increase the effective areas.

Therefore, the reinforcing material-having functional sheet prepared in the present invention is subjected to embossing processing using an embossing processing machine (manufactured by Sato engineers Co., Ltd.) to prepare a final molded article.

In this processing, the reinforcing material-having functional sheet has a thickness of preferably from 0.2 to 1.0 mm because the embossing processing can be performed favorably.

Electrode for Electric Double-Layer Capacitors

Next, the electrode for electric double-layer capacitors, which is one kind of reinforcing material-having functional sheet, according to the present invention is described in detail.

Figure 2:
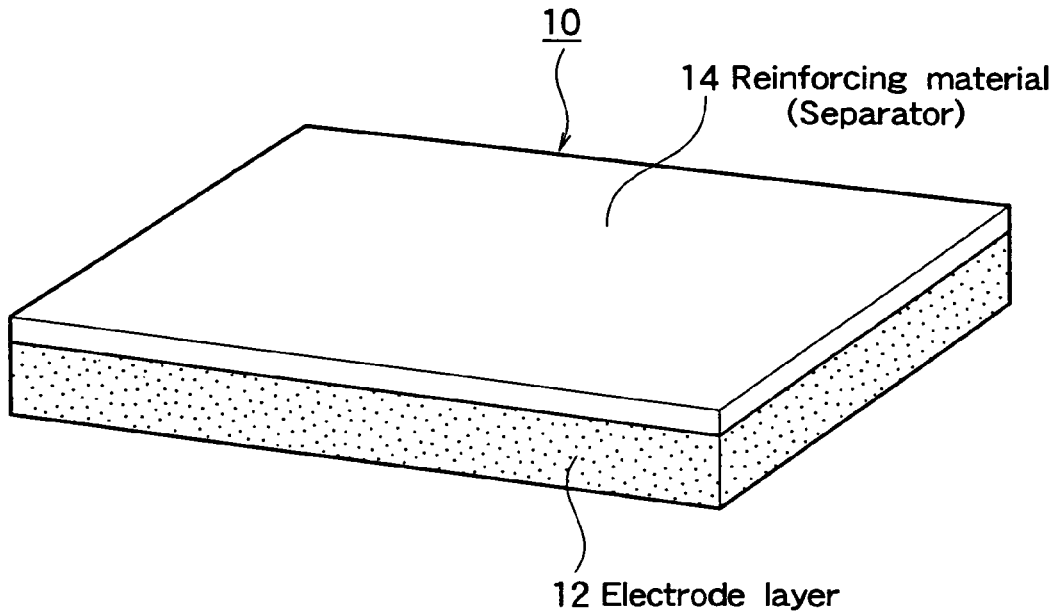
FIG. 2 is a perspective diagram of a reinforcing material-having sheet electrode according to one embodiment of the present invention.

FIG. 2 is a perspective diagram of an electrode for electric double layer capacitors according to the present invention.

FIG. 2 shows an embodiment of the electrode for electric double-layer capacitors that on the front surface of a sheet-like electrode material (electrode layer) 12, a reinforcing sheet 14 (separator, reinforcing material) is bonded.

In such an electrode for electric double-layer capacitors 10, the sheet-like electrode 12 enters into the reinforcing sheet 14 and is thereby bonded in a laminated state with exhibition of the anchor effect.

Examples of the reinforcing sheet 14 may include a cloth, mesh, non-woven fabric and expanded sheet formed from synthetic resins such as PP, PE and the like; natural fibers such as cellulose and the like; inorganic fibers such as glass and the like; metals such as aluminum, nickel and the like; or carbonaceous fibers such as carbon fiber and the like. These reinforcing sheets have not only reinforcing function but also functions and effects as a separator and a collector in accordance with the kind of the raw material of the reinforcing materials.

The reinforcing sheet 14 has a thickness, which is usually not limited, of preferably from 0.01 to 1.0 mm. When the thickness is thinner than 0.01 mm, it is hard to obtain the sufficient reinforcing effect of the reinforcing, while when it is over 1.0 mm, it is hard to bond the reinforcing sheet and the sheet-like electrode because the reinforcing sheet works as a cushion and hardly enters into the sheet-like electrode.

The basis weight of the reinforcing sheet varies depending on the materials and is not particularly limited. Further, the reinforcing sheet desirably has appropriate void spaces because the excellent anchor effect can be obtained.

In the case that the reinforcing sheet used herein comprises synthetic resins such as PP, PE, phenol resin or fluororesin or the like; or natural fibers such as cellulose or the like, they are insulating substances so that they have the function and effect as a separator. In this case, the reinforcing sheet has a basis weight of preferably not less than 50 g/m$^2$. When the basis weight is less than 50 g/m$^2$, the electrode protrudes out from the reinforcing material so that the reinforcing sheet cannot play a role as a separator sufficiently.

In the case that where the material of the reinforcing sheet is a metal such as aluminum, nickel or the like, or carbonaceous fibers such as carbon fiber or the like, the reinforcing sheet has the function and effect as a collector. In this case, the basis weight of the reinforcing sheet is not particularly limited. When the thickness of the reinforcing sheet is thicker than 0.5 mm, the handling properties thereof become inferior, for example, taking-up is difficult due to the rigidity of the metal.

In the electrode for electric double-layer capacitors, the sheet-like electrode 12 has a thickness, which is not particularly limited, of usually from 0.1 to 1.0 mm, preferably about 0.2 to 0.8 mm.

The sheet-like electrode 12 comprises the carbon fine powder and the fluororesin.

The carbon fine powder preferably comprises active carbon and/or conductive carbon. The particle diameters of the active carbon and conductive carbon are not particularly limited. For example, the active carbon preferably has a particle diameter of about from 1 to 100 μm. The specific surface areas of the active carbon and conductive carbon are not particularly limited. For example, the active carbon preferably has a specific surface area of about from 1000 to 3000 m$^2$/g.

Preferable examples of the fluorine-containing polymer resin contained in the sheet-like electrode of the present invention may include polytetrafluoroethylene (PTFE), modified PTFE, PVDF, ETFE, PCTFE, FEP and PFA. In particular, the use of polytetrafluoroethylene (PTFE) is preferred because it is easily fiberized by a shear force and has a high binder effect capable of binding and integrating the carbon fine powder.

With regard to the content of the carbon fine powder contained in the sheet-like electrode 12, in order to depress the internal resistance of the electrode layer to be lower, the sheet-like electrode material desirably contains the binder of the non-conductive fluorine-containing polymer resin in an amount of preferably not more than 15% by weight (wt %), more preferably 1 to 10% by weight, most preferably 1 to 5% by weight.

When the binder amount is less than 1% by weight, the carbon fine powder has a fear of being released from the electrode of the electric double-layer capacitor and disintegrating because a sufficient binder effect is not obtained. When the binder amount is in the above range, particularly over 15% by weight, the internal resistance of the electrode layer tends to be hardly depressed to be low.

The combined use of the sheet-like electrode material containing the components in the above amounts and the reinforcing sheet remarkably improves the handling properties of the carbon fine powder which is a raw material of the functional material powder or the resulting electrode for electric double layer capacitors by the reinforcing effect of the reinforcing sheet. Further, using the reinforcing sheet and the sheet-like electrode material comprised of the carbon fine powder and the binder resin, the reinforcing material-having sheet-like electrode can be easily and economically prepared with good productivity by any method of a doctor blade method (uniting method with a knife) and a rolling method.

Figure 3:
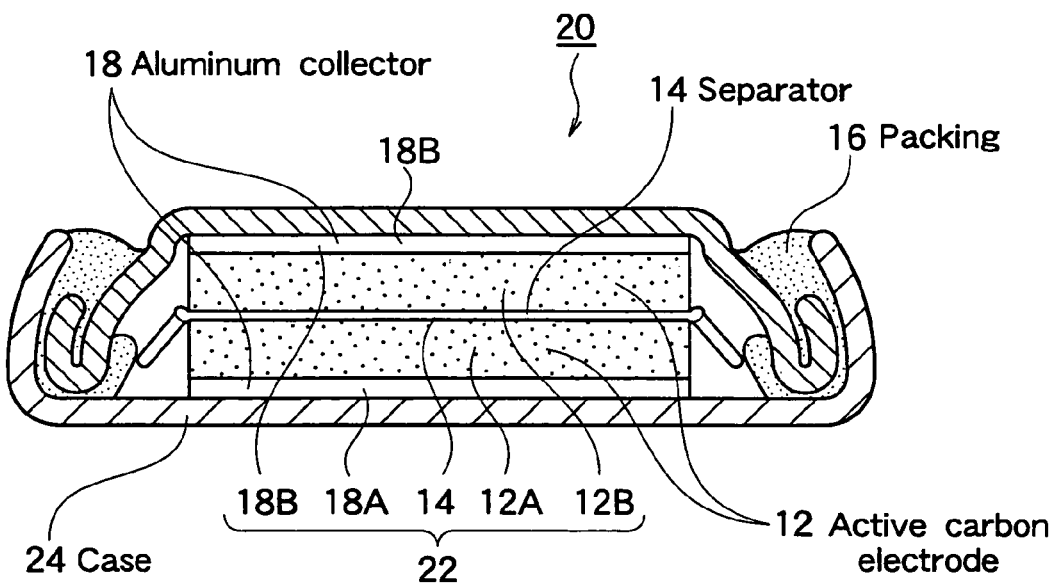
FIG. 3 is a cross-section of an electric double-layer capacitor in which a reinforcing material-having sheet electrode is incorporated according to one embodiment of the present invention.

The electrode for the electric double-layer capacitor according to the present invention can decrease the amount of the binder capable of contributing to the electrode strength in the sheet-like electrode 12 and results in lowering of the internal resistance of the electrode. In the case of using the reinforcing material of thermosetting phenol resins, glass or metals, the lifetime of the product is prolonged because the heat treatment can be carried out at a higher temperature and thereby the moisture removal can be carried out completely. Furthermore, when the electric double-layer capacitors 20, 30 as shown in FIGS. 3 and 4 described later are prepared using the electrode 10 for electric double-layer capacitors, the electrolyte solution can speedily permeate into the electrode.

The electrode for electric double-layer capacitors according to the present invention has the reinforcing sheet 14 and the reinforcing sheet 14 maintains the strength of the electrode, so that the sheet-like electrode can be lengthened and has excellent mass production properties.

In the electrode for electric double-layer capacitors according to the present invention, the reinforcing sheet 14 may be provided on only one surface of the sheet-like electrode 12 as shown in FIG. 2 or the electrode layer 12 may be provided on both of the surfaces of the reinforcing sheet 14.

Figure 4:
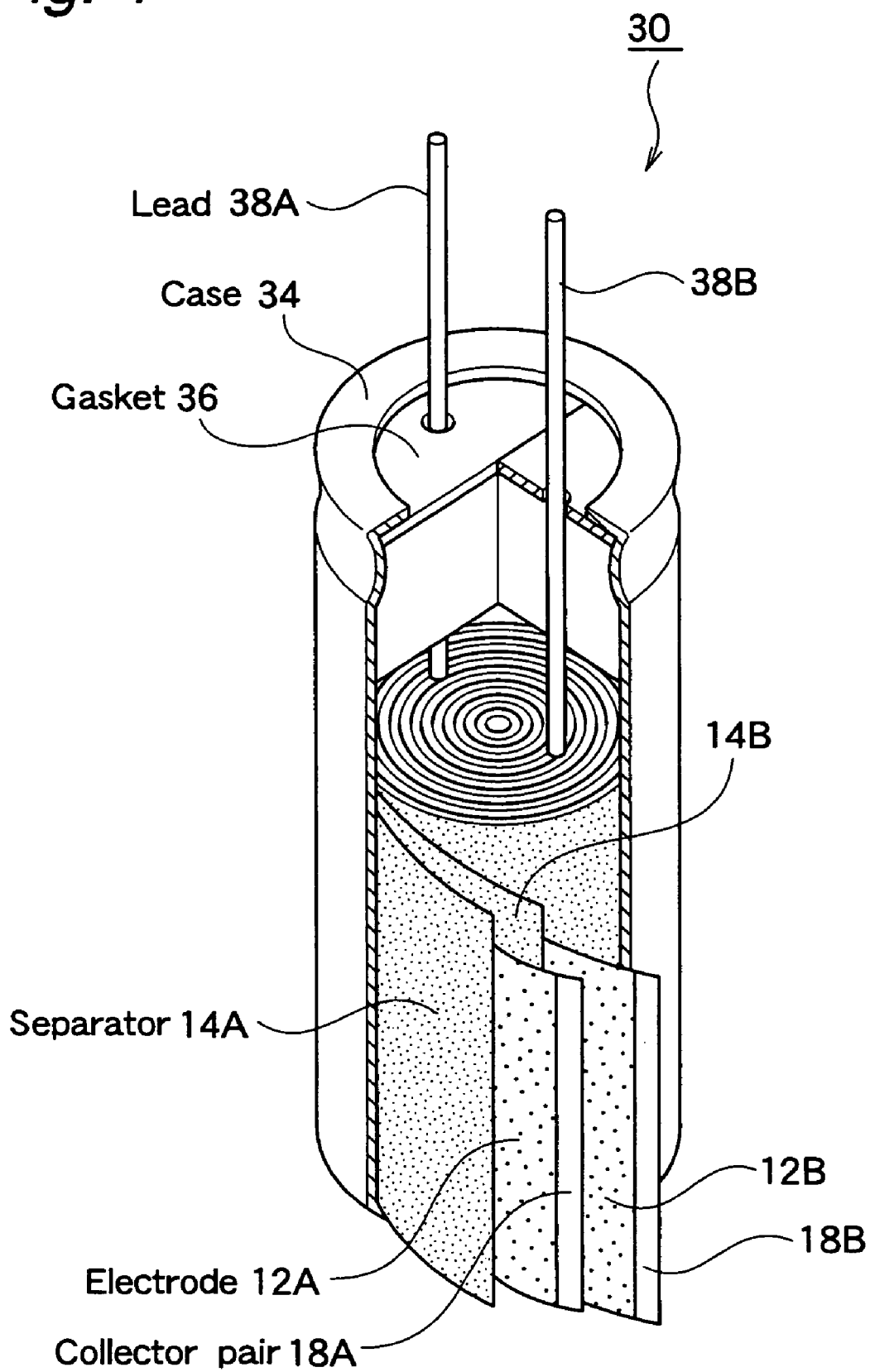
FIG. 4 is a perspective diagram of a part cross-section of an electric double-layer capacitor in which a reinforcing material-having sheet is incorporated according to another embodiment of the present invention.

As shown in FIG. 4 described later, the sheet-like electrode 12, the reinforcing sheet (separator and/or collector) 14 may be laminated one after the other and rolled up (in FIG. 4, each two layers are laminated).

Electric Double Layer Capacitor

The electric double layer: capacitor prepared using such an electrode for electric double layer capacitors is further described in detail with reference to FIGS. 3 and 4.

FIG. 3 is a cross-section of an electric double-layer capacitor in which an electrode for electric double layer capacitors is disposed according to one embodiment of the present invention.

In the electric double layer capacitor 20, the sheet-like electrode layers 12A and 12B are provided on both of the front and back surfaces of the reinforcing sheet (separator) 14 and the aluminum collectors 18A and 18B are respectively provided on the back surface of the electrode layer 12A and on the front surface of the electrode layers 12B.

The internal capacitor structure 22, which comprises the separator 14 (reinforcing material layer), the electrode layers 12A, 12B laminated on the front and back surfaces of the separator 14 respectively, and the aluminum collectors 18A, 18B, is put in a case 24 and sealed with a packing 16.

The electrode layer accommodated in the case is filled (impregnated) with the electrolyte solution.

The electric double layer capacitor 20 prepared using the electrode for electric double layer capacitors particularly has excellent light weight, capability for downsizing, performance and capability for decreasing the cost. As the electrode for electric double layer capacitors according to the present invention has excellent electrolyte impregnating properties because of containing a small amount of the binder and high strength, it has excellent handling properties, and thereby the assembling operation can be easily carried out in preparing the electric double layer capacitors and also the operation time can be shortened.

FIG. 4 is a perspective diagram of a part cross-section of an electric double-layer-capacitor in which an electrode for electric double layer capacitors is disposed according to another embodiment of the present invention.

In the electric double layer capacitor 30, the reinforcing sheets (separators) 14 and the sheet-like electrodes 12 are laminated alternately (in total, each two layers are laminated), rolled up and disposed in a case 34, the collector pairs 18A and 18B are respectively provided on the ends of the sheet-like electrodes 12A and 12B and leads 38A and 38B are provided on the collector pairs 18A and 18B so as to conduct to the outside of the electric double layer capacitor 30. Further, at the upper end of the inside of the case 34, a gasket 36 is disposed to seal the end.

The sheet-like electrode 12A, the collector pair 18A and the lead 38A are electrically connected and the sheet-like electrode 12B, the collector pair 18B and the lead 38B are electrically connected, and the group A and the group B do not leak into each other.

The electrode layer in the case is filled (impregnated) with the electrolyte solution.

The electrode for electric double-layer capacitors according to the present invention can be made into a long sized sheet with the unified separator so that the assembling operation is easy, the impregnating properties of the electrolyte solution are excellent and the operation properties in preparing the electric double-layer capacitors are improved.

Furthermore, the electric double layer capacitor 30 prepared using the electrode for electric double layer capacitors particularly has excellent light weight, capability for downsizing, performance and capability for decreasing the cost thereof.

In the reinforcing material having functional sheet (functional sheet) according to the present invention, the reinforcing sheet (reinforcing material) used herein has many void spaces such that the reinforcing sheet has a basis weight of from 10 to 400 g/m$^2$ and the fiber constituting the reinforcing sheet has a fiber diameter of 10 to 150 μm.

When to the reinforcing sheet, the kneadate of the functional powder and the binder resin or the softened sheet-like functional material is pressure-bonded, the above kneadate sufficiently enters into the void spaces between the countless fine fibers of the reinforcing sheet to exert a sufficient anchor effect and excellent interlayer peeling strength. As a result, the reinforcing material-having functional sheet has no peeling between the reinforcing sheet (layer) and the sheet-like functional material (layer) and thereby has excellent handling properties.

If the reinforcing sheet is thin, the amount of the sheet-like functional material (kneadate) to be pressure-bonded is small and therefore, a thin reinforcing material-having functional sheet having sufficient strength can be prepared with low cost.

Namely, using the same amount of the kneadate, a functional sheet having a longer size and more sufficient function and effect can be prepared as compared with conventional sheets.

Furthermore, the functional sheet is thin and has sufficient strength so that it can be subjected to embossing processing and can provide a catalyst sheet exhibiting a high effect.

In particular, in the electric double layer capacitor, which is one kind of the above reinforcing-having functional sheets, as the electrode strength is maintained by the reinforcing sheet in the sheet-like electrode for electric double layer capacitors, the amount of the binder in the electrode which binder contributes to the electrode strength can be decreased to the utmost.

Therefore, the internal resistance is remarkably decreased and a lowering of condenser capabilities of charging and discharging can be depressed, and thereby a condenser having excellent durability and long lifetime can be prepared.

Additionally, the step of enhancing the strength in the preparation of conventional sheet-like electrodes, for example, kneading step or the like is not required and thereby the preparation procedure can be simplified.

Further, the electrode having mechanical strength according to the present invention has favorable handling properties in not only the production but also the use thereof. Furthermore, the amount of the binder in the electrode can be decreased and thereupon, the impregnating properties of the electrolyte solution into the electrode improved and the handling properties in the condenser preparation is remarkably improved.

As a result, the electrode in such a state that the electrolyte solution is sufficiently impregnated into the electrode can be incorporated into a battery for a short time so that the operation time for preparing the electric double layer capacitor can be shortened.

EXAMPLE

Hereinafter, the reinforcing material having functional sheet according to the present invention is described in more detail with reference to the examples for deodorizing apparatuses using active carbon as a functional powder and the examples for the electric double layer capacitors, but the present invention should not be limited by the examples.

Deodorizing Apparatus

Examples A1 to A4

An active carbon powder (coal type active carbon powder having an average particle diameter of 30 μm, a specific surface area, as measured by the method in accordance with JIS-K-1474, of from 1000 to 1500 $m^2/g$) and a PTFE particle-dispersed solution (containing 60% by weight of PTFE particles having an average particle diameter of 200 nm, using water as a disperse medium) were mixed in the amounts as described later and kneaded using a kneader at 10° C. for 5 min.

Subsequently, the resulting kneadate was molded using a roll machine in which the roll surface temperature was kept to 60° C., at a pressure 150 Kg/cm into a sheet-like state having a thickness of 0.4 mm.

The resulting sheet-like functional material was pressure-bonded to one surface of a propylene non-woven fabric having a thickness of 0.1 mm (fiber diameter: 30 μm, basis weight: 15 $g/cm^2$) to prepare a flat functional sheet having a thickness of 0.4 mm.

Comparative Examples A1 and A2

In each comparative example, the kneadate of the active carbon powder and the fluorine resin was molded using a rolling machine into a 0.5 mm thick sheet in the same procedure as in Example A1 and the resulting functional sheet as it is was used as a sample without pressure bonding the sheet to one surface of a non-woven fabric as described in Example A1.

Comparative Examples A3 and A4

In each comparative example, the kneadate of the active carbon powder and the fluorine resin was molded using a rolling machine into a 0.5 mm thick sheet in the same procedure as in Example A1 and the resulting sheet was pressure-bonded to one surface of a propylene net having a thickness of 0.3 mm (in Comparative Example A3, fiber diameter: 300 μm, basis weight: 200 $g/cm^2$, in Comparative Example A4, fiber diameter: 30 μm, basis weight: 450 $g/cm^2$) to prepare a flat functional sheet having a thickness of 0.6 mm in the same manner as in Example A1.

Using the reinforcing material-having functional sheets prepared in Examples A1 to A4 and Comparative Examples A1 to A4, the following tests were carried out.

Test A1

Deodorizing Effect

The ammonia absorption and adsorption force was measured.

Strength

The tensile strength was measured.

The results are inclusively shown in Table 1.

TABLE 1

| Sample name | Active carbon/PTFE (wt %) | Reinforcing material (fiber diameter · basis weight) | Deodorizing effect *1 | Strength (N) |
|---|---|---|---|---|
| Compar. Ex. A1 | 80/20 | none | Breakage at processing | 0.3 |
| Compar. Ex. A2 | 40/60 | none | 40% | 1.1 |
| Ex. A1 | 80/20 | Used (30 μm · 15 $g/cm^2$) | 85% | 2.5 |
| Ex. A2 | 90/10 | Used (30 μm · 15 $g/cm^2$) | 95% | 2.5 |
| Ex. A3 | 95/5 | Used (30 μm · 15 $g/cm^2$) | 100% | 2.5 |

*1 The relative value is given based on 100% in Example A3.

Test A2

Peeling Strength

With regard to the functional sheets prepared in Example A1 and Comparative Example A1, the peeling strength was measured in accordance with the strength of peeling copper foil defined in JISC 6471.

That is, the reinforcing material side of the functional sheet prepared in Example A1 was bonded to a support fitment and then the peeling strength (peel strength) was measured. The peeling strength of the functional sheet prepared in Comparative Example A1 was also measured in the same manner.

As comparative data, a sample without a reinforcing material pressure bonded was bonded to a support fitment and the same measurement was carried out.

The results are inclusively shown in Table 2.

Additionally, the appearance of the peeling of each sample was also shown in Table 2.

TABLE 2

| Sample name | Active carbon/PTFE (wt %) | Reinforcing material (fiber diameter · basis weight) | Peeling strength (N) | Appearance |
|---|---|---|---|---|
| Compar. Ex. A3 | 80/20 | Used (300 μm · 200 $g/cm^2$) | Not more than 0.3(N) (not more than strength of functional material) | Unmeasured Functional material, and reinforcing material easily peeled. |

TABLE 2-continued

| Sample name | Active carbon/ PTFE (wt %) | Reinforcing material (fiber diameter · basis weight) | Peeling strength (N) | Appearance |
|---|---|---|---|---|
| Compar. Ex. A4 | 80/20 | Used (30 μm · 450 g/cm²) | Not more than 1.1(N) (not more than strength of functional material) | Unmeasured Functional material and reinforcing material easily peeled. |
| Ex. A1 | 80/20 | Used (30 μm · 15 g/cm²) | Not less than 2.5(N) (not less than strength of functional material) | Unmeasured Flaking off between functional material's layers occurred. |
| Ex. A4 | 80/20 | Used (100 μm · 350 g/cm²) | Not less than 2.5(N) (not less than strength of functional material) | Unmeasured Flaking off between functional material's layers occurred. |

As is clear from the test A2, the reinforcing material having functional sheet prepared in Example A1 has higher bonding strength with the reinforcing sheet.

Electric Double Layer Capacitor

Next, the electrode for electric double layer capacitors according to the present invention is further described in detail with reference to the following examples.

Example B1

Active carbon (average particle diameter: 25 μm, coconut shell active carbon), conductive carbon black (manufactured by Ketjen black international Co. Ketjen black EC) and a binder (polytetrafluoroethylene PTFE) were mixed in a weight ratio of 80:15:5, and 150% by weight of ethanol was added as a molding assistant to them and kneaded at 20° C. Thereafter, the kneadate was rolled using a roll press at a surface temperature of 40° C. to prepare a sheet having a thickness of 0.65 mm.

The resulting sheet-like electrode was pressure bonded to a reinforcing sheet (PP non-woven fabric, thickness: 0.1 mm) using a roll press (distance between rolls: 0.65 mm) at a surface temperature of 40° C.

Two test pieces cut off from the reinforcing material-having electrode film (thickness: 0.65 mm, area: 2 cm²) were placed through a separator (cellulose filter paper having a thickness of 0.12 mm) so that both of the poles (test pieces) were facing each other, and an electrolyte solution was fed to prepare a condenser.

With regard to the condenser, the initial capacitance (F/cm³, Note 1) and the volume resistivity (Ω·cm, Note 2) were measured under conditions that the charging electrical voltage was 2.5 V and the discharging electric current was 5.0 mA.

As a result, the initial capacitance was 12.1 (F/cm³) and the volume resistivity was 0.73 (Ω·cm, Note 2).

In the electrode film, the PTFE amount can be decreased. Accordingly, the electrode film contains PTFE in an amount of 5%, which is a half of the PTFE amount of the sheet electrode prepared in Comparative Example B1. In place of the decreased amount 5% of PTFE, the conductive carbon amount is increased by 5% and thereby the electric resistance is decreased. Note 1: Initial capacitance (F/cm³):

The condenser used herein is prepared in such a manner that two electrode films (thickness: 0.65 mm, area: 2 cm²) were placed through a separator (cellulose filter paper having a thickness of 0.12 mm) so that both of the poles were facing each other, and a propylene carbonate solution of 1 mol/L of tetrafluoroboric acid tetraethyl ammonium was used as an electrolyte.

The initial capacitance was measured at a charging electric voltage of 2.5 V and a discharging electric current of 5 mA.

Note 2: The volume resistivity (Ω·cm) was measured in accordance with JIS K 7194.

Note 3: Tensile strength measuring method:

The electrode film sheet was cut off into a piece having a width of 10 mm and a length of 60 mm and the tensile strength was measured by Instron.

Example B2

The test piece was prepared in the same manner as in Example B1 except that the thickness of the reinforcing sheet was 0.3 mm. In this case, the reinforcing sheet performs as a separator, so the test was carried out without using the separator.

As a result, the initial capacitance was 12.1 (F/cm³) and the volume resistivity was 0.73 (Ω·cm).

Example B3

The procedure of Example B1 was repeated except that the binder was used in an amount of 10% by weight, namely active carbon, conductive carbon black and the binder were used in a weight ratio of 8:1:1.

As a result, the initial capacitance was 12.1 (F/cm³) and the volume resistivity was 1.10 (Ω·cm).

Comparative Example B1

The procedure of Example B1 was repeated except that an electrode film without a reinforcing material was used and the binder was used in an amount of 10% by weight, namely active carbon, conductive carbon black and the binder were used in a weight ratio of 8:1:1, to prepare a sheet-like electrode.

As a result, the initial capacitance was 12.0 (F/cm³) and the volume resistivity was 1.10 (Ω·cm).

Comparative Example B2

The procedure of Example B1 was repeated except that an electrode film without a reinforcing material was used and the binder was used in an amount of 20% by weight, namely active carbon, conductive carbon black and the binder were used in a weight ratio of 7:1:2, to prepare a sheet-like electrode.

As a result, the initial capacitance was 10.2 (F/cm³) and the volume resistivity was 2.26 (Ω·cm).

The results in Examples B1 to B3 and Comparative Examples B1 and B2 are inclusively shown in Table 3.

TABLE 3

|  | Example | | | Comparative Example | |
| --- | --- | --- | --- | --- | --- |
|  | B1 | B2 | B3 | B1 | B2 |
| Active carbon: Conductive carbon black: Binder | 80:15:5 | 80:15:5 | 8:1:1 | 8:1:1 | 7:1:2 |
| Thickness of Reinforcing sheet (mm) | 0.1 | 0.3 | 0.1 | — | — |
| Basis weight of Reinforcing sheet (g/m$^2$) | 15 | 50 | 15 | — | — |
| Separator Present or absent | present | absent | present | present | present |
| Initial capacitance F/cm$^3$ Note 1 | 12.1 | 12.1 | 12.0 | 12.0 | 10.2 |
| Volume resistivity Ω · cm Note 2 | 0.73 | 0.73 | 1.10 | 1.10 | 2.26 |
| Strength N/cm | 2.25 | 13.7 | 2.27 | 1.69 | 2.41 |

As is clear from the above, the reinforcing material-having functional sheets according to the present invention have various kinds of excellent functions in accordance with the kind of the functional material powder used, for example, when the functional material powder is a carbonaceous material such as active carbon or the like, the reinforcing having functional sheets are preferably used for deodorizing, improving the water quality and adsorbing solvents, or when it is titanium oxide, they are preferably used for photocatalysts. Further, the reinforcing material having functional sheets have sufficient strength in handling and no releasing and elimination of the functional material, and can be continuously mass-produced and can be also thinned with maintaining the strength.

In the electric double layer capacitor, which is one kind of the reinforcing material-having functional sheets, the strength of the electrode is maintained by the reinforcing sheet in the sheet-like electrode for the electric double layer capacitor, so it is possible to decrease the amount of the binder in the electrode contributing the electrode strength to the utmost. Furthermore, the impregnating properties of the electrolyte solution to the electrode are also improved and the handling properties are very favorable in the preparation of condensers.

Therefore, according to the present invention, condensers-having excellent durability and long lifetime, that the internal resistance is vastly decreased, a lowering of charging and discharging capabilities is depressed, can be prepared in the more simplified production procedure, so the resulting condensers can be favorably used in the field of production of electric double layer capacitors.

The invention claimed is:

1. A functional sheet having a reinforcing material comprising a sheet-like functional material comprised of a functional material powder and a binder resin, and, bonded thereto, a reinforcing sheet laminated on the sheet-like functional material,
   wherein the reinforcing sheet comprises a woven or non-woven fabric cloth, having a basis weight of from 10 to 400 g/cm$^2$, the fiber diameter of a fiber constituting the reinforcing sheet is from 10 to 150 μm.

2. The functional sheet having a reinforcing material according to claim 1 wherein the binder resin is an un-sintered polytetrafluoroethylene resin and contained in an amount of from 50 to 1% by weight based on the total amount of the sheet-like functional material.

3. The functional sheet having a reinforcing material according to claim 2 wherein the functional material powder comprises one kind or two or more kinds selected from active carbon, graphite, carbon black, bamboo charcoal, charcoal, titanium oxide, zinc oxide, lead oxide, silica, clay, metal powder, expanded graphite, water absorbing polymer, silica gel, mildew proofing agent and antibacterial agent.

4. The functional sheet having a reinforcing material according to claim 2, which is an embossed reinforcing material-having functional sheet.

5. The functional sheet having a reinforcing material according to claim 1 wherein the functional material powder comprises one kind or two or more kinds selected from active carbon, graphite, carbon black, bamboo charcoal, charcoal, titanium oxide, zinc oxide, lead oxide, silica, clay, metal powder, expanded graphite, water absorbing polymer, silica gel, mildew proofing agent and antibacterial agent.

6. The functional sheet having a reinforcing material according to claim 5, which is an embossed reinforcing material-having functional sheet.

7. The functional sheet having a reinforcing material according to claim 1, which is an embossed reinforcing material-having functional sheet.

8. An electrode for electric double-layer capacitors comprising a sheet-like electrode material comprised of a carbon fine powder and a fluorine-containing polymer resin, and, bonded thereto, a reinforcing sheet, laminated on the sheet-like functional material,
   wherein the reinforcing sheet comprises a woven or non-woven fabric cloth, having a basis weight of from 10 to 400 g/cm$^2$, the fiber diameter of a fiber constituting the reinforcing sheet is from 10 to 150 μm.

9. The electrode for electric double-layer capacitors according to claim 8 wherein the reinforcing sheet comprises any one of a cloth, a mesh, a non-woven fabric cloth and an expand sheet, and has a thickness of from 0.01 to 1.0 mm.

10. The electrode for electric double-layer capacitors according to claim 9 wherein the carbon fine powder comprises active carbon and/or conductive carbon, and the fluoropolymer resin is polytetrafluoroethylene.

11. The electrode for electric double-layer capacitors according to claim 9 wherein the fluorine resin is contained in an amount of not more than 15% by weight in the electrode material.

12. An electric double-layer capacitor comprising the electrode for electric double-layer capacitors according to claim 9.

13. The electrode for electric double-layer capacitors according to claim 8 wherein the carbon fine powder comprises active carbon and/or conductive carbon, and the fluoropolymer resin is polytetrafluoroethylene.

14. The electrode for electric double-layer capacitors according to claim 13 wherein the fluorine resin is contained in an amount of not more than 15% by weight in the electrode material.

15. An electric double-layer capacitor comprising the electrode for electric double-layer capacitors according to claim 13.

16. The electrode for electric double-layer capacitors according to claim 8 wherein the fluorine resin is contained in an amount of not more than 15% by weight in the electrode material.

17. An electric double-layer capacitor comprising the electrode for electric double-layer capacitors according to claim 16.

18. An electric double-layer capacitor comprising the electrode for electric double-layer capacitors according to claim 8.

* * * * *